Figure 1:
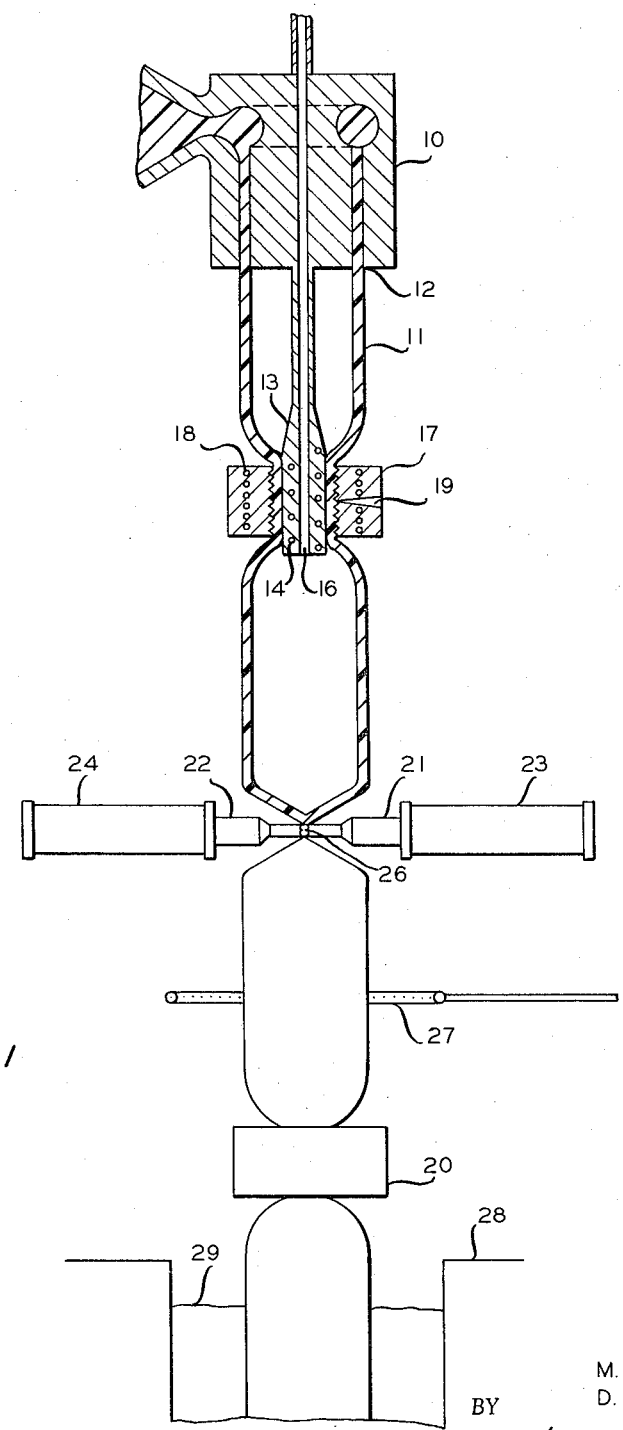

INVENTORS
M. R. CINES
D. D. BUTTOLPH
BY
Young & Quigg
ATTORNEYS

Dec. 27, 1966  M. R. CINES ETAL  3,294,885
METHOD FOR BLOW MOLDING THERMOPLASTIC
Filed May 9, 1963  2 Sheets-Sheet 2

INVENTORS
M. R. CINES
D. D. BUTTOLPH
BY
*Young & Quigg*
ATTORNEYS

United States Patent Office

3,294,885
Patented Dec. 27, 1966

3,294,885
METHOD FOR BLOW MOLDING THERMOPLASTIC
Martin R. Cines and Doyle D. Buttolph, Bartlesville, Okla., assignors to Phillips Petroleum Company, a corporation of Delaware
Filed May 9, 1963, Ser. No. 279,185
3 Claims. (Cl. 264—99)

This invention relates to a method for forming hollow articles from the thermoplastic material by blow molding.

Thermoplastic materials such as polyethylene and polypropylene are quite valuable for making containers such as bottles, jugs, carboys and the like because they form readily by blow molding and are quite inert to chemicals. Bottles formed from high density polyethylene and ethylene copolymers have found wide commercial acceptance for the packaging of detergents and household bleach. These polymers are also useful when fabricated into film for making bags. Such film can be greatly strengthened by orientation methods which normally involve stretching the film at controlled temperatures. It would be highly desirable if the advantages of orientation which are currently enjoyed in films made from crystalline thermoplastic polymers could be obtained in hollow articles such as bottles normally formed by blow molding. The effective molding of such articles does not, however, readily lend itself to the necessary temperature conditioning for polymer orientation. Also, it has not been apparent how the effects of biaxial orientation could be realized by modification of conventional blow molding techniques.

According to our invention a method is provided whereby the above discussed advantages of biaxial orientation are obtained in hollow articles such as bottles which are formed from crystalline thermoplastic polymer by blow molding. In the method of our invention molten polymer is extruded as an elongated parison which is then pinched at intervals while still in a heat-softened condition so that the parison is divided into sealed sections. The polymer is then cooled to a temperature below its crystalline freezing point after which it is reheated to within a few degrees below the crystalline melting point of the polymer. After being thus temperature conditioned, the parison sections are stretched by internal fluid pressure which forces the parison wall to assume the shape of an enclosing mold. The molded item is then cooled in order to set the orientation which has been produced in the polymer.

Figure 2:
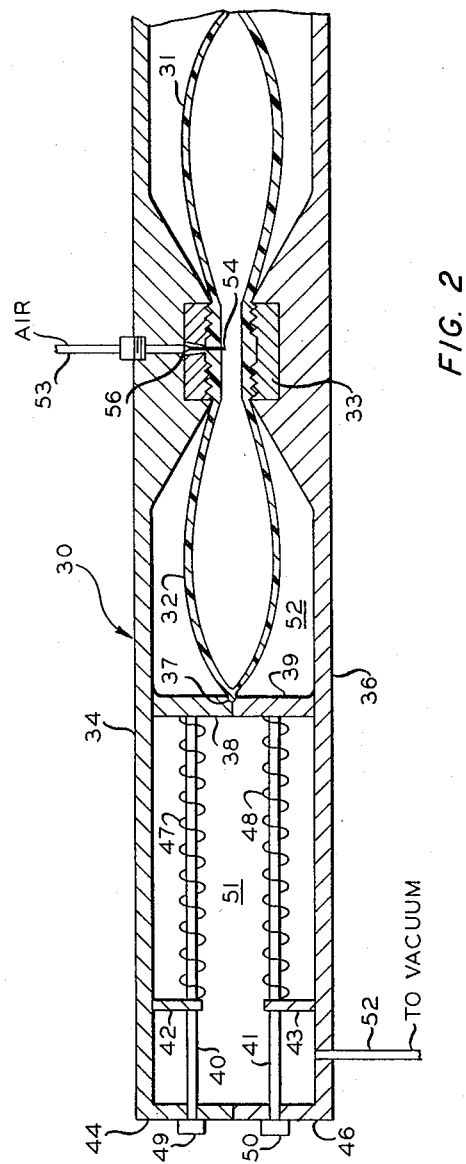

It is an object of our invention to provide an improved method for forming hollow articles from thermoplastic material by blow molding. Another object is to provide bottles which have been formed by blow molding, said bottles having strengthened wall sections as a result of molecular orientation produced during the molding process. Another object is to provide an improved method for fabricating bottles by blow molding in such a manner that the bottles can be temperature conditioned for maximum orientation during the molding step. Other objects, advantages and features of our invention will be apparent to those skilled in the art from the following discussion and drawing in which:

FIGURE 1 is a schematic diagram partly in section, illustrating parison formation and temperature conditioning thereof, and FIGURE 2 is a partial sectional view of a double bottle mold equipped for longitudinal stretching of the parison prior to or during inflation and molding of the bottle.

While this invention can be used advantageously in the fabrication of any crystallizable thermoplastic polymer such as polyvinylidine chloride, nylon, polyethylene glycol terephthalate or the like, it is of particular advantage in the biaxial orientation of the highly crystalline olefin polymers, such as polyethylene, polypropylene, poly-1-butene, poly-4-methylpentene-1 and other homopolymers and copolymers of similar mono-1-olefins containing up to 8 carbon atoms per molecule. We prefer to practice the invention with the more crystalline olefin polymers, for example those having a degree of crystallinity of at least 70 and more preferably at least 80 percent at 25° C. Examples of such polymers are crystalline polypropylene and polybutenes and the high density ethylene polymers, particularly the homopolymers of ethylene and copolymers of ethylene with higher mono-1-olefins, these polymers having a density of about 0.940 to 0.990 gram per cubic centimeter at 25° C. As used herein the term "density" refers to the weight/unit volume (grams/cubic centimeter) of the polymer at 25° C. The density of polymer should be determined while the sample of the polymer is at thermal and phase equilibrium. In order to insure this equilibrium it is desirable to heat the sample to a temperature 15 to 25 centigrade degrees above its melting point and allow the sample to cool at a rate of about 2 centigrade degrees/minute to the temperature at which the density is to be measured. Any standard method for determining the density of a solid can be used. The crystallinity of the olefin polymers can be determined by X-ray diffraction or nuclear magnetic resonance. Prior to the determination of crystallinity it is desirable that the sample of the polymer be treated for thermal equilibration in a manner described in connection with the density determination.

The higher crystalline olefin polymers referred to above do not have a single freezing and melting point but instead have a crystalline freezing point at which maximum crystalline formation occurs upon cooling of the molten polymer and a separate crystalline melting point at which evidence of crystallinity disappears upon heating a sample of the polymer from a cooled crystalline condition. Ordinarily the latter temperature is several degrees above the crystalline freezing point. The crystalline freezing point of these polymers can be determined by melting a sample of the polymer, inserting a thermocouple in the molten polymer and allowing the polymer to cool slowly. The temperature is recorded and plotted on a chart versus time. The crystalline freezing point is the first plateau in the time-versus-temperature curve. For polyethylene having a density of about 0.960 the crystalline freezing point is about 252° F. The crystalline melting point of these polymers can be determined by freezing a small piece of plastic (usually film) under crossed polaroids in a microscope equipped with means for heating the polymer. The specimen is heated slowly and the melting point is the temperature at which birefringence disappears. For polyethylene having a density of about 0.960 the crystalline melting point is ordinarily about 272° F.

The optimum temperature for orientation is the highest temperature which can be achieved while the resin mass is still in a substantially crystalline condition. This temperature will vary depending upon the polymer used and its crystalline melting point. For ease of control it is desirable that this temperature be approached from below by heating a film of the polymer which is in a substantially uniform crystalline state. Nonunifomity in the crystalline condition of the polymer makes it difficult to stretch the tube so that a bottle wall of uniform gauge is obtained. In the production of the bottles, therefore, we desire to form the tube, cool it to a crystalline state and then reheat it to the orientation temperature.

In the formation of a parison suitable for blow molding, the molten polymer is first extruded in tubular form. Referring now to FIGURE 1, an extrusion head 10 is shown from which issues a tube of thermoplastic 11 from an annular orifice 12. The extrusion temperatures will vary considerably depending upon the polymer used. For polymers such as high density polyethylene or polypropylene, extrusion temperatures of about 350 to 400° F. are frequently employed. The tube, as it issues from the die, is in a hot sealable condition and provision should be made, as by the elimination of air drafts, to prevent premature cooling of the extruded tube. Since the tube is in a softened condition, which is to be maintained for a brief period, it is extruded downwardly as illustrated in FIGURE 1.

Axially disposed within the extruded tube is a mandrel 13 which is equipped with cooling coils 14. Mandrel 13 is also equipped with a central passageway 16 through which a gas can be introduced into the tube in order to keep it from collapsing and/or provide internal pressure for subsequent molding, as will later be described.

As the tube passes continuously about mandrel 13, it is gripped at spaced intervals by a series of neck molds, one of which is illustrated in section as mold 17. Neck mold 17 contains internal cooling passages 18 and an opening 19 through which a needle may be inserted for injecting pressurized fluid, as will subsequently be explained. Neck-forming mold 17 grips a portion of the parison 11 between its inner surfaces and mandrel 13. Cooling fluid circulating through the passages 14 of mandrel 13 and passages 18 of neck mold 17 chill that portion of the parison which is pressed between the neck mold and the mandrel. In this manner the neck portions of two bottles are formed, these neck portions having threads as illustrated in FIGURE 1.

Rapid chilling, which is provided by the mandrel and neck mold, permits the neck portions of the parison to slip over the mandrel and be moved and supported by the neck mold 17. The neck mold then advances downwardly passing from the mandrel to the position which is illustrated by neck mold 20. When the neck molds are in the positions of molds 17 and 20 illustrated in FIGURE 1, pinching members 21 and 22 are advanced by cylinders 23 and 24, respectively, so that the parison walls are pinched together and a seal is formed at a point equidistant between neck molds 17 and 20. Since the tube 11 is still in a heat-softened condition, having just issued from the extrusion die, a good seal can be obtained merely by pinching together the walls of the tube by members 21 and 22. The cooling of the neck sections is sufficiently rapid and distant from the point of sealing that the temperature at said point is not significantly affected. The sealing edges 26 of members 21 and 22 are shaped to provide a bead associated with each portion of the parison which is divided by the seal. These beads can be used for gripping the ends of the parison segments for longitudinal stretching, as will be explained later. The sealing edges 26 can also be provided with a cutting edge which severs segments of the tube at the point of sealing. Alternatively, the segments can be permitted to remain attached until immediately prior to their enclosure within the bottle molds.

After the seal between the parison segments has been made, the segments advance through a cooling zone as indicated by spray ring 27. Ring 27 is supplied with a cooling fluid such as water which sprays upon the outer surface of the parison. In this manner the parison is cooled so that the polymer therein is below its crystalline freezing point. After the polymer has thus been cooled, the parison segments are passed into a heating bath 28 containing a fluid 29 such as ethylene glycol. At this point the polymer is reheated to within a few degrees below its crystalline melting point which is the temperature desired for orientation. Other cooling and heating means such as circulating gas, radiant heaters or temperature controlled sleeves can be used.

The temperature at which orientation is carried out is dependent upon the polymer employed. Using an ethylene polymer having a density of about 0.96 gram per cubic centimeter at 25° C., the orientation should be carried out at a temperature in the range of about 260 to to 270° F. Preferably the polymer has been cooled by ring 27 to about 230° F. after which it is reheated in bath 28 to about 265° F. This temperature conditioning insures that all of the polymer is in a uniform crystalline orientatable condition.

After the parison segments have thus been conditioned, they are enclosed within the double bottle molds, as illustrated in FIGURE 2. The bottle mold 30 is shown containing the parison segment which has two halves 31 and 32. The center of the parison is still held by neck mold 33 which can be used for transporting the parison segment from the reheating bath to the bottle mold 30. The bottle mold 30 has two half-sections 34 and 36 which close together about the parison segment. As the mold halves are thus closed, the bead 37 at the sealed end of segment half 32 is gripped by plates 38 and 39 which together form the bottom of the mold. Plates 38 and 39 are slidably mounted within mold halves 34 and 36 and are supported on rods 40 and 41 which, in turn, are held by brackets 42 and 43 and the end sections 44 and 46 of the mold halves. Plates 38 and 39 are biased toward the center of the mold by springs 47 and 48. The forward position of plates 38 and 39 is limited by knobs 49 and 50 on the ends of rods 40 and 41, respectively.

At the beginning of the molding operation, volume 51 within mold 30 is evacuated through tube 52, thereby causing the atmospheric pressure within volume 52 to force plates 38 and 39 toward the end of the mold. This produces a longitudinal stretching of segment half 32. Mechanical or electrical retraction means can be used instead of differential fluid pressure. The amount of stretching can be up to about 6 times the original length of the parison segment. While the longitudinal stretching can be omitted, if it is used an elongation of at least 150 percent is desirable. Simultaneously, with said longitudinal stretching, fluid such as air under pressure is injected into the parison segment through tube 53 and needle 54 which has pierced the parison segment at the neck portion, entering through opening 56 in neck mold 33. The pressure of fluid thus introduced forces the walls of the parison out against the walls of the mold. The parison is sized so that an enlargement in diameter of from 1½ to 6 times is required in order to fill the mold. With the polymer having been temperature conditioned prior to this molding step, biaxial orientation is produced in the walls of the bottle thus molded. This orientation is brought about by the simultaneous inflation and longitudinal stretching of the parison segment. A duplicate of this process occurs simultaneously at the other end of the mold 30 in the fabrication of segment half 31.

As an alternative to the injection of fluid through tube 53 and needle 54, an internal pressure within the parison segment can be provided through the injection of gas through channel 16 in mandrel 13 of FIGURE 1 as the parison segments are formed. This internal fluid pressure is insufficient to deform the parison segments at atmospheric pressure but is sufficient to inflate the parison against the walls of the mold when the space between the parison and the mold walls is evacuated. In this case a channel to the vacuum source is also provided connected to volume 52. The differential pressure between volumes 52 and 51 can still be maintained so that plates 38 and 39 are retracted toward the end of the mold and longitudinal stretching of the parison is produced.

In order to illustrate further advantages of our invention, the following example is presented. The conditions given are typical only and should not be construed to limit our invention unduly.

Polyethylene having a density of 0.960 gram per cubic centimeter at 25° C. and a melt index of 0.6 is extruded into the form of a tube at a temperature of 350° F. The tube is pressed between mandrel and neck molds and cooled in the portion only between the mandrel and neck mold to 180° F. with the rest of the tube remaining at approximately 325° F. A seal is formed by pinching together the walls of the parison so that separate segments of the parison are formed, each segment being gripped at its center portion by a neck mold. The segment is then cooled to 230° F. by passing through a water spray after which the parison enters a bath of ethylene glycol maintained at 266° F. After the parison segment has been reheated to 265° F., it is enclosed within a double bottle mold wherein it is stretched longitudinally and simultaneously inflated with a blow-up ratio of original to final diameter of 1:3. During inflation of the parison it is stretched longitudinally to approximately 1½ times its original length. The bottle is then cooled to 180° F. and ejected from the mold after which it is trimmed and severed at the neck portion to form two separate bottles. The walls of the bottles are strengthened as a result of the molecular orientation produced during molding. Also a tight seal is formed at the bottom of each bottle.

As will be apparent to those skilled in the art from the above discussion, various modifications can be made in our invention without departing from the spirit or scope thereof. It is contemplated, for example, that parison formation, neck forming, sealing, temperature conditioning and molding operations be carried out continuously. A series of neck-forming molds linked together on a conveyor can be arranged to close sequentially about spaced portions of the extruded tube and thereafter carry the tube past the operations of sealing, cooling and reheating. A separate series of double bottle molds can then be arranged to enclose around the parison segments which have been separated and the molding operations can then be conducted individually. When the molds are opened, the neck molds and molded bottles are removed therefrom. The neck molds are then opened and the finished bottles are trimmed and separated by severing at the neck sections. The neck molds can then be returned to repeat the cycle at the tube die.

We claim:
1. A method of forming a bottle from polymer of a 1-olefin by blow molding which comprises extruding the molten polymer in the shape of a parison about an axially disposed mandrel, closing a neck-forming mold about a portion of said parison passing over said mandrel thereby pressing said portion between said neck-forming mold and said mandrel, cooling said portion to set same into the shape formed between said mold and mandrel, advancing said neck mold and parison portion beyond said mandrel, pressing together the walls of said parison at a point spaced from said neck mold while the polymer at said point is still in a hot, sealable condition thereby forming a seal between adjacent parison sections, cooling the polymer in the parison section between said neck mold and said seal below the crystalline freezing point of said polymer, reheating the cooled polymer in said section to within a few degrees below the crystalline melting point of said polymer, enclosing the thus reheated parison section within a bottle mold, introducing through the wall of said parison fluid pressure thereby inflating said section with internal fluid pressure against the walls of said bottle mold while said polymer is still in its reheated condition, cooling the polymer in said section to set the orientation produced on inflation, and ejecting the oriented plastic bottle from said bottle mold.

2. A method of continuously forming bottles from crystalline polymer of 1-olefins by blow molding which comprises extruding the molten polymer as an elongated tube in a hot, sealable condition, passing said tube around but out of contact with a cooled, axially disposed mandrel, sequentially closing a series of neck-forming molds at spaced intervals about portions of said tube passing around said mandrel thereby pressing said portions between said mandrel and said neck molds and forming neck sections for two bottles with each neck mold, the body sections for two bottles being held between two adjacent neck molds, pressing together the walls of said tube at a point equidistant between each pair of adjacent neck molds while the polymer is still in said sealable condition thereby forming seals at said points and dividing said tube into distinct closed segments, each segment including body sections for two bottles and held at the center by a neck mold, cooling said segments below the crystalline freezing point of the polymer, reheating said segments to within a few degrees below the crystalline melting point of said polymer, enclosing each segment within a double bottle mold, injecting gas into each segment at the neck section thereby expanding each segment out against the walls of said bottle mold, gripping the sealed ends of each segment and stretching same concomitantly with said expanding with gas pressure, said expanding and stretching being carried out while the polymer in said segment is in the reheated orientatable condition, cooling the molded segments to set the orientation, ejecting said segment from said bottle mold, and cutting each molded segment at the neck portion into two bottles.

3. The method of claim 2 wherein said polymer is high density ethylene polymer having a crystalline freezing point of about 250° F. and a crystalline melting point of about 270° F.

References Cited by the Examiner

UNITED STATES PATENTS

| 2,919,462 | 1/1960 | Friden | 264—99 |
| 2,991,500 | 7/1961 | Hagen | 264—98 X |
| 3,069,722 | 12/1962 | Kato | 18—5 |
| 3,089,186 | 5/1963 | Park | 18—5 |
| 3,125,619 | 3/1964 | Miller | 264—98 |
| 3,217,071 | 11/1965 | Plymale et al. | 264—98 |

FOREIGN PATENTS 1,171,388   1/1959   France.

ROBERT F. WHITE, *Primary Examiner.*

A. R. NOE, *Assistant Examiner.*